(12) United States Patent
Gunny et al.

(10) Patent No.: US 10,100,549 B1
(45) Date of Patent: Oct. 16, 2018

(54) LIGHTING APPARATUS FOR TENTS AND CANOPIES

(71) Applicants: Evan Curtis Gunny, Woodlands Hills, CA (US); Brian Joseph Ravitch, Granada Hills, CA (US); Andrew James Smith, Los Angeles, CA (US)

(72) Inventors: Evan Curtis Gunny, Woodlands Hills, CA (US); Brian Joseph Ravitch, Granada Hills, CA (US); Andrew James Smith, Los Angeles, CA (US)

(*) Notice: Subject to any disclaimer, the term of this patent is extended or adjusted under 35 U.S.C. 154(b) by 0 days.

(21) Appl. No.: 15/629,693

(22) Filed: Jun. 21, 2017

Related U.S. Application Data

(60) Provisional application No. 62/353,529, filed on Jun. 22, 2016.

(51) Int. Cl.
| | |
|---|---|
| *E04H 15/10* | (2006.01) |
| *F21S 4/24* | (2016.01) |
| *F21V 23/00* | (2015.01) |
| *F21V 23/04* | (2006.01) |
| *F21V 23/06* | (2006.01) |

(Continued)

(52) U.S. Cl.
CPC ............ *E04H 15/10* (2013.01); *B60Q 3/80* (2017.02); *F21S 4/24* (2016.01); *F21V 21/088* (2013.01); *F21V 21/096* (2013.01); *F21V 23/003* (2013.01); *F21V 23/0435* (2013.01); *F21V 23/06* (2013.01); *H05B 37/029* (2013.01); *H05B 37/0272* (2013.01); *F21Y 2103/10* (2016.08); *F21Y 2115/10* (2016.08)

(58) Field of Classification Search
CPC ............ H05B 33/0854; H05B 37/0227; H05B 37/0281; H05B 37/0272; H05B 37/02; H05B 33/0842; Y02B 20/42; Y02B 20/44; F21V 21/145; F21V 21/0832; F21V 15/01; F21L 4/02; F21L 4/023; H02J 9/02; F21Y 2103/10
See application file for complete search history.

(56) References Cited

U.S. PATENT DOCUMENTS

| | | |
|---|---|---|
| 6,340,233 B1 | 1/2002 | Shieh |
| 7,455,427 B1 | 11/2008 | Freeman |

(Continued)

OTHER PUBLICATIONS

"Portable Canopy Tent Lighting With LED Strip Lights Kit", https://www.superbrightleds.com/blog/portable-canopy-tent-lighting-with-led-strip-lights-kit/1726/, retrieved and printed on Jun. 18, 2017.

*Primary Examiner* — Haissa Philogene

(57) ABSTRACT

Tents and canopies are ubiquitous for outdoor recreation and gatherings. Tents and canopies are poorly lit, especially during night time. Camping lights such as lanterns are ineffective for lighting the entire space of a tent or canopy. To address these issues, a lighting apparatus can improve the quality of lighting inside a tent or a canopy by lighting a tent using a plurality of flexible strips having lighting elements thereon and providing a housing enclosing a lighting controller circuit for controlling the lighting elements. The flexible strips are electrically coupled to the lighting controller and extends away from the lighting controller. The housing can be hung inside, near the top center point of the tent or canopy to illuminate not only the area inside the tent or canopy, but also the tent or canopy itself. The lighting apparatus has a unique physical design suited for tents, canopies, and automobiles.

20 Claims, 13 Drawing Sheets

(51) Int. Cl.
  *F21V 21/088* (2006.01)
  *F21V 21/096* (2006.01)
  *H05B 37/02* (2006.01)
  *B60Q 3/80* (2017.01)
  *F21Y 115/10* (2016.01)
  *F21Y 103/10* (2016.01)

(56) References Cited

U.S. PATENT DOCUMENTS

| | | | |
|---|---|---|---|
| D698,073 S | 1/2014 | Duquette | |
| 8,829,799 B2* | 9/2014 | Recker | H02J 9/02 |
| | | | 315/159 |
| D742,055 S | 10/2015 | Marshal | |
| 9,504,114 B2* | 11/2016 | Moriwaki | H05B 33/0854 |
| 2003/0179576 A1 | 9/2003 | Huang | |
| 2012/0206050 A1* | 8/2012 | Spero | B60Q 1/04 |
| | | | 315/152 |
| 2014/0119004 A1* | 5/2014 | Yuan | F21L 14/023 |
| | | | 362/231 |
| 2015/0034137 A1 | 2/2015 | Tanaeim | |
| 2016/0091185 A1* | 3/2016 | Soderholm | F21V 21/0832 |
| | | | 362/11 |

* cited by examiner

LIGHTING APPARATUS FOR TENTS AND CANOPIES

PRIORITY DATA

This patent application claims benefit of U.S. Provisional Application Ser. No. 62/353,529 entitled "LIGHTING APPARATUS FOR TENTS AND CANOPIES" filed on Jun. 22, 2016, which is hereby incorporated by reference in its entirety.

TECHNICAL FIELD OF THE DISCLOSURE

The present disclosure relates generally to lighting apparatus and lighting apparatuses, and method of operating thereof.

BACKGROUND

Tents and canopies are ubiquitous for outdoor recreation and gatherings. Tents and canopies are poorly lit, especially during night time. Camping lights such as lanterns are ineffective for lighting the entire space of a tent or canopy.

BRIEF DESCRIPTION OF THE DRAWING

To provide a more complete understanding of the present disclosure and features and advantages thereof, reference is made to the following description, taken in conjunction with the accompanying figures, wherein like reference numerals represent like parts, in which.

DESCRIPTION OF EXAMPLE EMBODIMENTS OF THE DISCLOSURE

Overview

Figure 1:
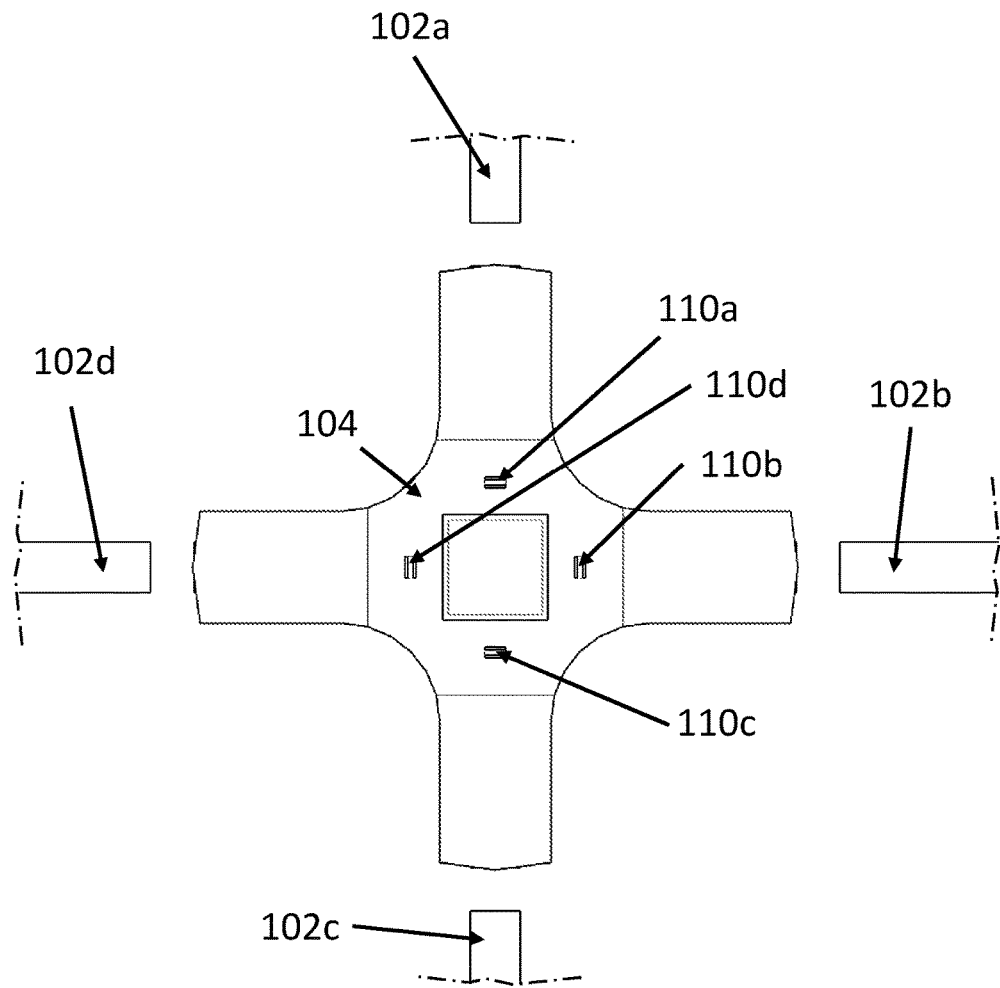
FIG. 1 is a top plan view of a lighting apparatus including flexible strips having lighting elements thereon, according to some embodiments of the disclosure.

To address some of the issues of lighting, a lighting apparatus can improve the quality of lighting inside a tent or a canopy by lighting a tent using a plurality of flexible strips having lighting elements thereon and providing a housing enclosing a lighting controller circuit for controlling the lighting elements. The flexible strips are electrically coupled to the lighting controller and extends away from the lighting controller. The housing can be hung inside and/or near the top center point of the tent or canopy to illuminate not only the area inside the tent or canopy, but also the tent or canopy itself. The lighting apparatus has a unique physical design suited for tents, canopies, and automobiles.

Tents encompass camping tents of various shapes and sizes, including but not limited to ridge tents, dome tents, geodestic tents, semi-geodesic tents, instant or quick-pitch tents, inflatable tents, yurts, Khyam system tents, tunnel tents, Vis-à-vis tents, pod living tents, large family tents, frame tents, teepees, trailer tents, etc. Generally, tents are made with fabric or flexible sheets which create an enclosure for humans or pets. Tents are usually propped up by poles or some suitable frame or structure. Canopies are often used to provide cover for camping, cover for vendors at a market or festival, recreation, etc. Automobiles, as used herein, refer to vehicles such as passenger vehicles, vans, small busses, recreational vehicles, campers, etc. While many passages describe or refer to a tent, it is intended by the disclosure that those passages are also applicable to temporary structures, canopies, and automobiles as well.

Limitations of Other Tent Lighting Systems

The most common tent lighting system is a singular lamp or lantern. In some cases the lamp or lantern can be placed on the ground. In some other cases, the lamp or lantern can be hung from the top center point of a tent. However, the lamp or lantern is poor at illuminating the entire area of a tent since it only provides a single source of light. Some lighting systems on the market allows a user to hang a single string of lights or a light bar inside a tent, but the string of lights lacks in functionality, and a single string of lights can only illuminate a lateral area of a tent. Some other lighting systems leave unpleasant wiring to a battery pack within a tent, or lacks easy and variable user controls.

Tents and canopies pose a unique environment and challenge for lighting. It is not trivial to easily illuminate the entire area of a tent or canopy. Power may not necessarily be available or can be limited, especially if the tent is located outdoors. A tent or canopy may not necessarily provide convenient places for attaching lighting to the tent or canopy.

Exemplary Features of the Lighting Apparatus

To improve lighting for tents, an improved lighting apparatus has a central piece for controlling a plurality of flexible strips having lighting elements thereon/therein, wherein the flexible strips extends outwards (or extends radially) from the central piece. The central piece can be (removably) attached to the top center part of a tent, and may include electrical circuitry for controlling the lighting elements on the flexible strips. The electrical circuitry can be remotely controlled by a remote controller. In some embodiments, the central piece also includes a power supply to avoid unsightly and cumbersome cables to a power source.

Attachment means can include hanging, gluing, clipping, and tying. Attachment means can be mechanical or magnetic. The flexible strips extending outwards or extending radially away from the central piece can be removably attached to parts of the tent via, e.g., clips, hooks, straps, or magnets. In a preferred embodiment, the lighting apparatus can have at least three flexible strips (serving as lighting strips), or least four flexible strips which extends radially outward from the central piece. The flexible strips can be at least one foot long each. The physical design enables the lighting apparatus to illuminate a large area of a tent (much more than a simple lateral area of a tent). Moreover, when the flexible strips having the lighting elements thereon are placed near or on the fabric or flexible sheets of a tent, a large portion of tent itself is also illuminated. Like a lamp shade, the fabric or flexible sheets of the tent having the lighting elements nearby provides a medium for the light to travel or reflect off of, making the large portion of a tent illuminate or become self-illuminated to provide ambient light inside the tent. If the fabric or flexible sheets are transparent or translucent, the lighting apparatus can also create ambient light outside of the tent and viewable from outside of the tent.

In some embodiments, the central piece can be placed outside of the tent, whose weight would help keep the lighting apparatus in place on top of the tent. These embodiments are most suitable when the tent fabric or flexible sheets are transparent or translucent.

In another aspect, the central piece provides circuitry for executing different lighting modes for the lighting elements on the flexible strips. Lighting modes can include color, intensity, duration, and pre-programmed lighting sequences. Lighting modes can also be configured/programmed onto the lighting apparatus by a remote controller. A user can advantageously create mood lighting for the tent. Pre-programmed lighting sequences can have controllable parameters such as intensity and frequency/speed. The flexible strips can be individually controllable to execute different lighting modes and/or parameters for lighting sequences. The lighting elements on the flexible strips (e.g., such as a top light and/or bottom light) can also be individually controllable to execute different lighting modes. A remote controller can be used to transmit signals or messages to the central piece to request lighting modes or execute other control commands. A user can remotely control his/her lighting apparatus. When many of the lighting apparatuses are in the field, a remote controller can coordinate and arrange a display by remotely controlling the lighting apparatuses.

Physical Design Aspects

Figure 2:
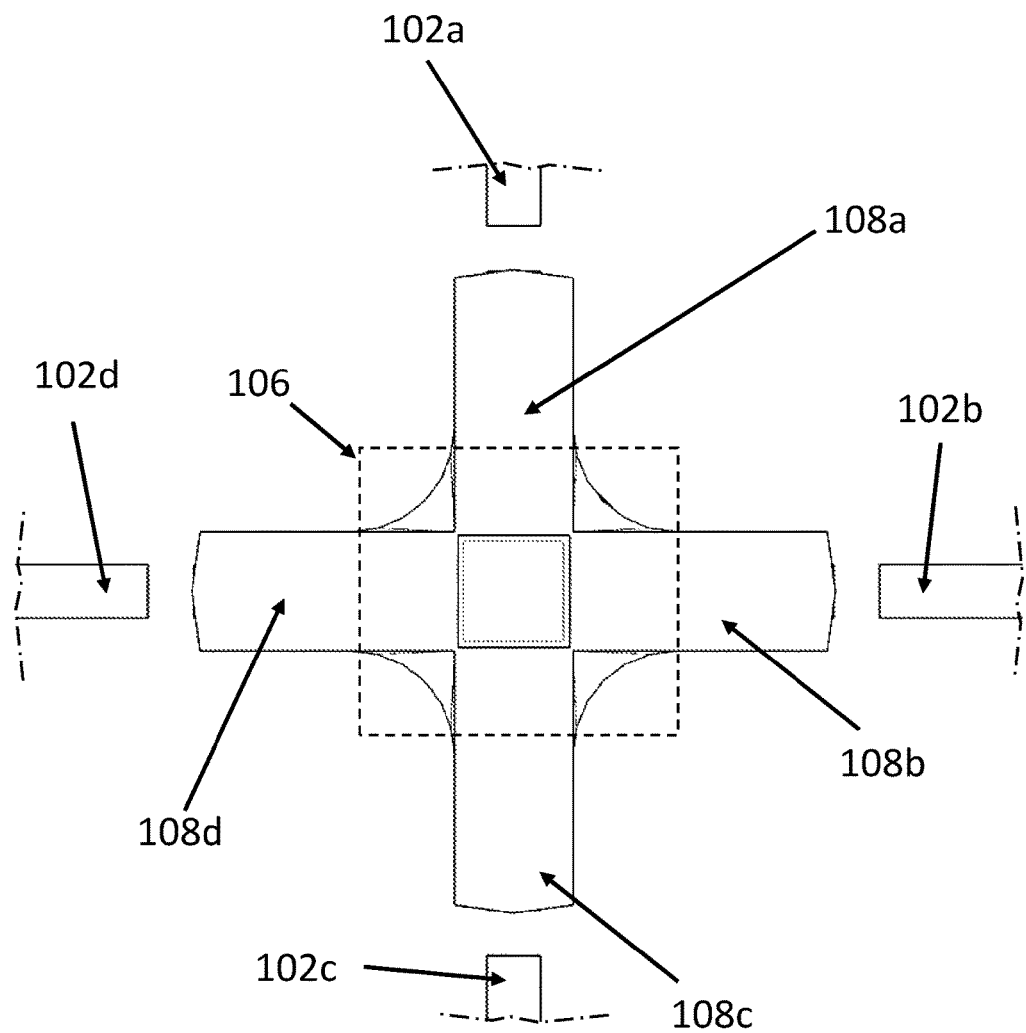
FIG. 2 is a bottom plan view of a lighting apparatus including flexible strips having lighting elements thereon, according to some embodiments of the disclosure.

FIG. 1 is a top plan view of a lighting apparatus including flexible strips having lighting elements thereon, according to some embodiments of the disclosure. FIG. 2 is a bottom plan view of a lighting apparatus including flexible strips having lighting elements thereon, according to some embodiments of the disclosure. Top/bottom can be interchangeable, depending on the user configuration of the lighting apparatus.

The lighting apparatus has a plurality of flexible strips (e.g., lighting strips 102a-d) having lighting elements thereon. The flexible strips (sometimes referred herein as lighting strips) can include a flexible circuit having lighting elements thereon. The lighting apparatus also includes a communication circuit for receiving signals transmitted to the lighting apparatus from a remote controller (not visible in the FIGURE). The lighting apparatus includes a lighting controller circuit (or sometimes referred simply as the lighting controller) for controlling the lighting elements of the flexible strips based on the signals (not visible in the FIGURE). The lighting apparatus also includes a housing enclosing the lighting controller circuit (and the communication circuit). The housing can include a power supply (not visible in the FIGURE). The housing and components inside of it can be considered the "central piece" 104 of the lighting apparatus.

The flexible strips, when the lighting apparatus is assembled, are electrically coupled to the lighting controller and extends (radially) away from the lighting controller. In this example, four lighting strips 102a-d are shown to radially extend from the central piece 104. Other number of lighting strips can be used, e.g., two, three, four, five, six, or more.

The lighting elements can be light emitting diodes. Preferably, the light emitting diodes can be controlled to emit a plurality of colors. The length of the lighting strips can be at least a foot. The length of the lighting strips can vary depending on the use or application of the lighting apparatus. For the sake of illustration, the full length of the lighting strips is not shown in the FIGURE.

As shown in the FIGURE, the lighting strips 102a-d appear to be removed from the central piece 104. In some embodiments, a flexible strip can be removably coupled to the lighting controller through a mechanical connector at openings of the housing configured to receive the mechanical connector. A mechanical connector can mechanically couple the lighting strips 102a-d to the central piece 104 and enable the lighting strips 102a-d to electrically couple to the internal circuitry of the central piece 104 (e.g., lighting controller circuit and power supply). The flexible strips can be advantageously removable (and replaceable) in the event that any one or more flexible strips fail. The removability can also allow a user to customize the number of lighting strips, the length of the lighting strips, and the color capabilities of the lighting strips.

In some embodiments, the flexible strips are permanently affixed to the lighting controller, and the flexible strips can extend away from the lighting controller through openings 130 of the housing. The housing can enclose at least a portion of the flexible strips, e.g., to protect the electrical and mechanical connection of the flexible strips to the lighting controller and/or power supply.

The lighting strips can have one or more lighting elements per inch of the lighting strip, as an example. Other density of lighting elements are envisioned.

The flexible strips can include a flexible circuit encased in transparent or translucent material to provide a smooth outer surface for the flexible strips. The material preferably has sufficient thickness and stiffness to protect the integrity of the flexible circuit (e.g., prevent excessive bending of the flexible circuit and damage to the flexible circuit). The material can also enable easier handling of the flexible circuit. Moreover, the material may also offer self-illumination or create an effect of ambient lighting to diffuse the light from the lighting elements.

The housing (or "center piece" 104) can include a center portion 106 and portions 108a-d extending outwards on a plane away from a center portion 106 of the housing, and the portions 108a-d encloses parts of the flexible strips. The number of portions extending outwards (radially outward) from the center portion can correspond to the number of desired flexible strips for the lighting apparatus. The resulting housing has a star fish like shape. The housing may not necessarily have four portions 108a-d.

The housing can be made of hard plastic entirely. The housing can be made of a combination of hard plastic and silicone. In one example, the housing can include silicone outer covering to offer easier grip and handling. In some examples, at least a part of the center portion 106 is made with hard plastic (or other suitable material), and the portions 108a-d can be made of silicone with less rigidity than the hard plastic. The silicone remains protective of and provides structural support for the flexible strips while allowing the flexible strips to bend.

Logos, graphics, and/or text can be printed on the housing. The housing can have logos, graphics, and/or text etched thereon.

In some embodiments, the lighting apparatus can include means for hanging the housing or securing the housing to a part of a tent or canopy. Various embodiments described herein can also be used for hanging the housing or securing the housing to a part of an automobile. In one example, the housing includes holes or apertures 110a-d that allow a string or long piece of material to go through the holes or apertures to secure the string or material to the housing. The string or material can be secured to or form as means for attaching the lighting apparatus to a structure such as a tent, canopy, automobile, etc. The string or material is an example of one or more members attachable to cavities of the housing (e.g., holes or apertures 110a-d). In some embodiments, the lighting apparatus can include one or more members for attaching the housing to a tent or canopy. The one or more members can include means for attaching the one or more members to a tent or canopy. The means for hanging the housing or the means for attaching the one or more members to a part of a tent or canopy can include clip for attaching the lighting apparatus to fabric or flexible sheet (of the tent or canopy, or automobile). The clip can be secured to a string or material. The means for hanging the housing or the means for attaching the one or more members to a part of a tent or canopy can include one or more magnets for attaching the lighting apparatus to metal (of the tent or canopy). The means for hanging the housing to a part of a tent or canopy can further include one or more hooks for hanging the housing onto a loop inside the tent or canopy. These examples can also be used for hanging the housing or securing the housing to an automobile.

Various means can be used for securing the lighting strips to a tent or canopy. In some embodiments, the lighting apparatus can include loops fitted around the flexible strips attached to clips for hanging the plurality of flexible strips to fabric or a flexible sheet. In some embodiments, the lighting apparatus can include loops fitted around the flexible strips attached to magnets for attaching the plurality of flexible strips to metal. In some embodiments, the lighting apparatus can include loops fitted around the flexible strips attached to hooks for hanging the plurality of flexible strips on hoops, rods, or tent poles.

Figure 3:
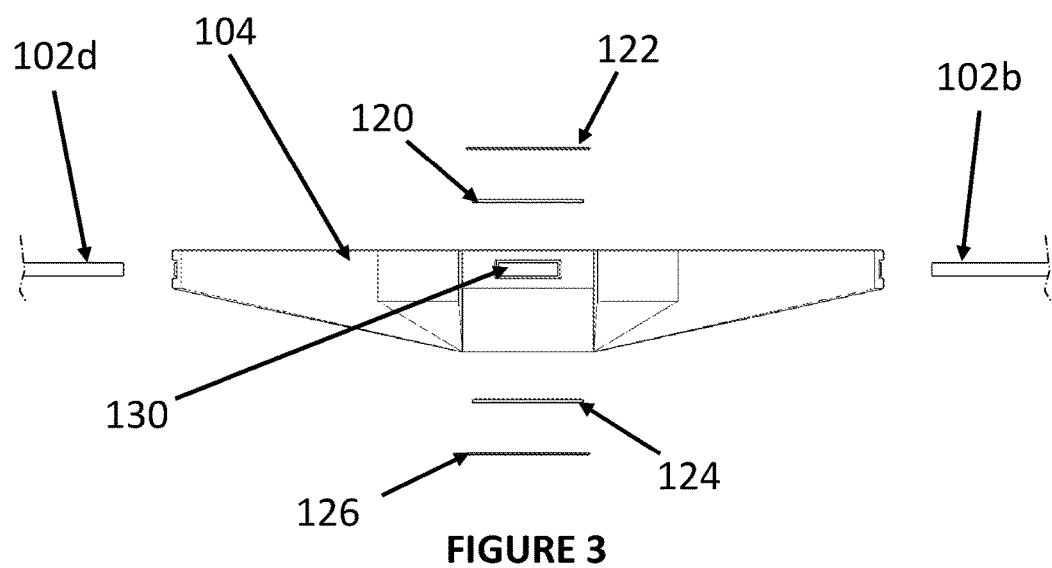
FIG. 3 is a left/right side exploded view of a lighting apparatus, according to some embodiments of the disclosure.
Figure 4:
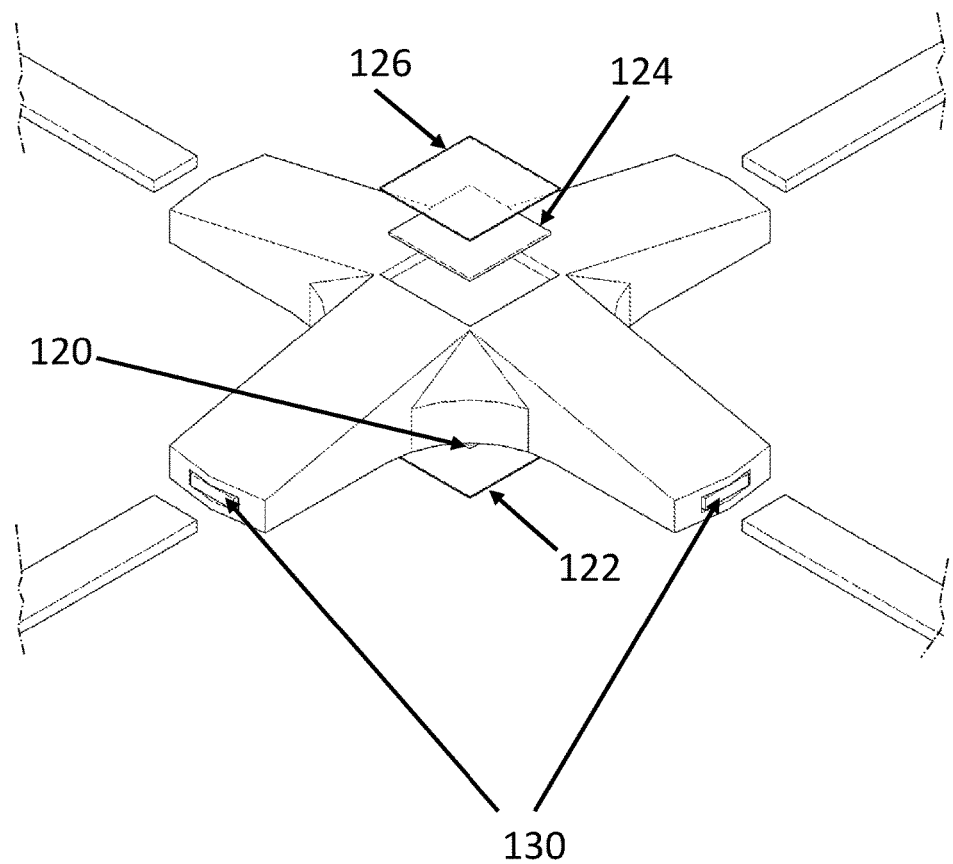
FIG. 4 is a first perspective exploded view of a lighting apparatus, according to some embodiments of the disclosure.
Figure 5:
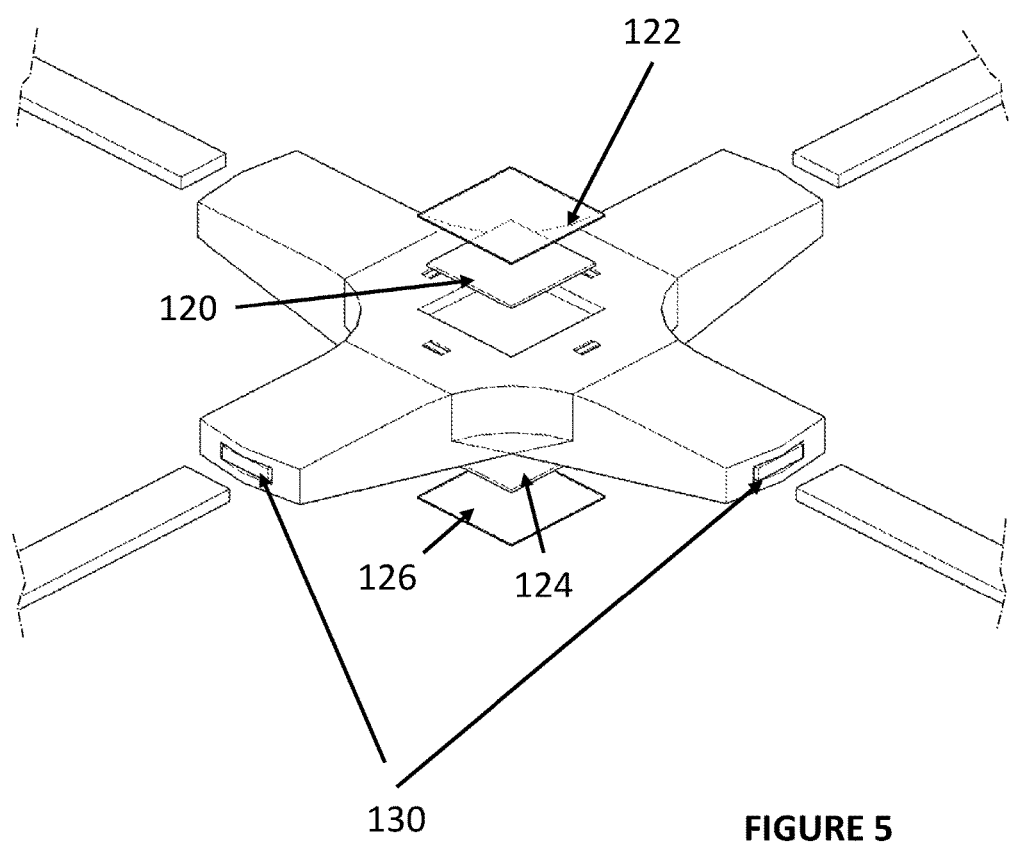
FIG. 5 is a second perspective exploded view of a lighting apparatus, according to some embodiments of the disclosure.
Figure 6:
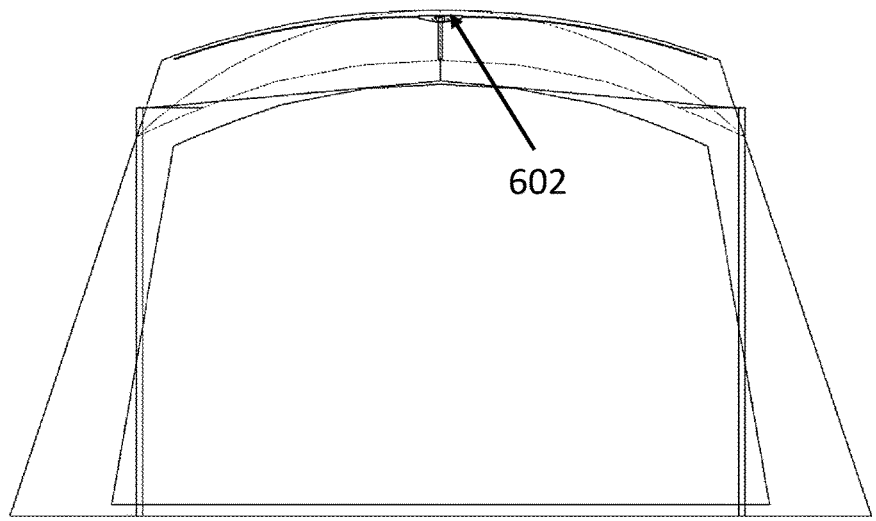
FIGS. 6-10 illustrate exemplary placements of the lighting apparatus 602 with a tent, according to some embodiments of the disclosure.
Figure 7:
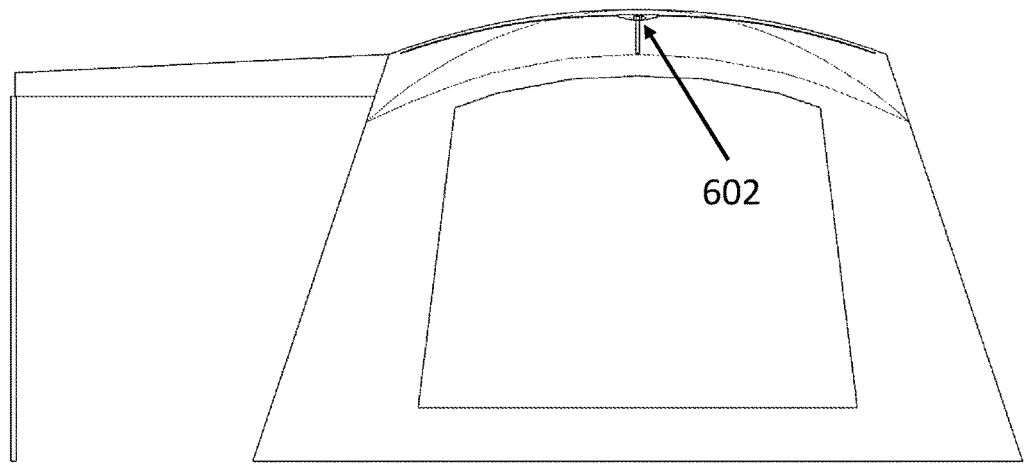
Figure 8:
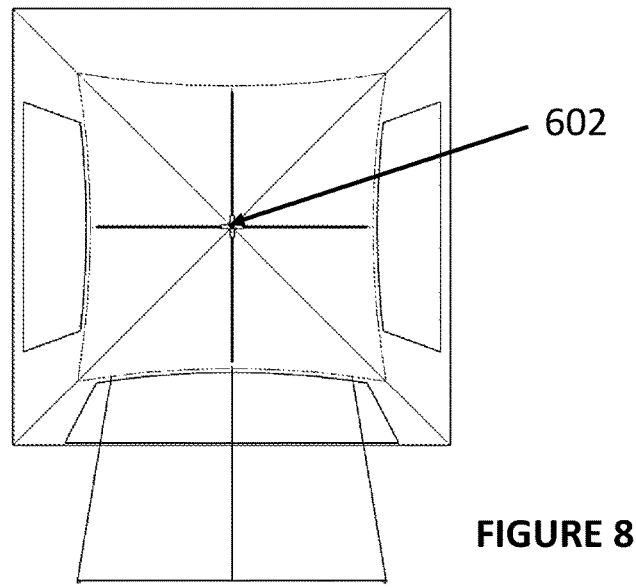
Figure 9:
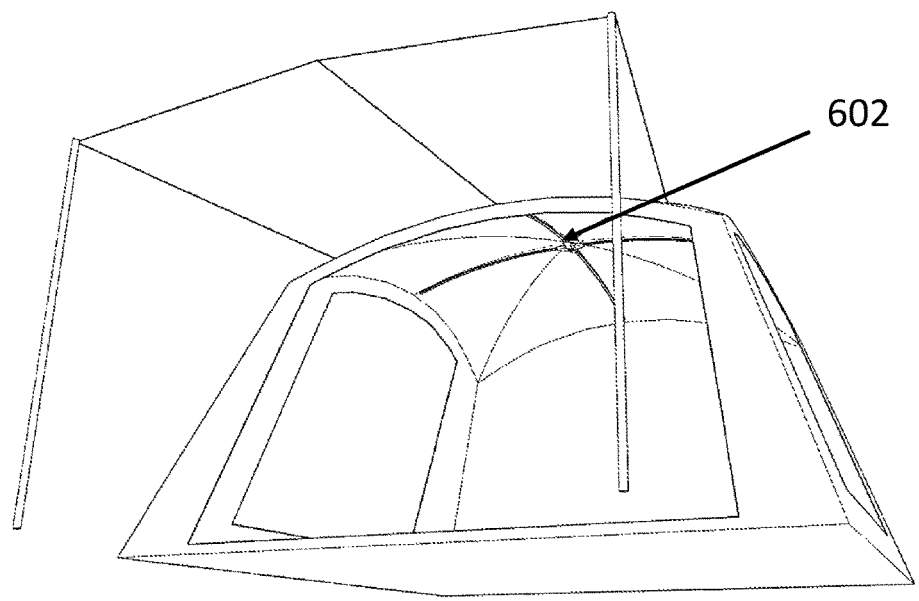
Figure 10:
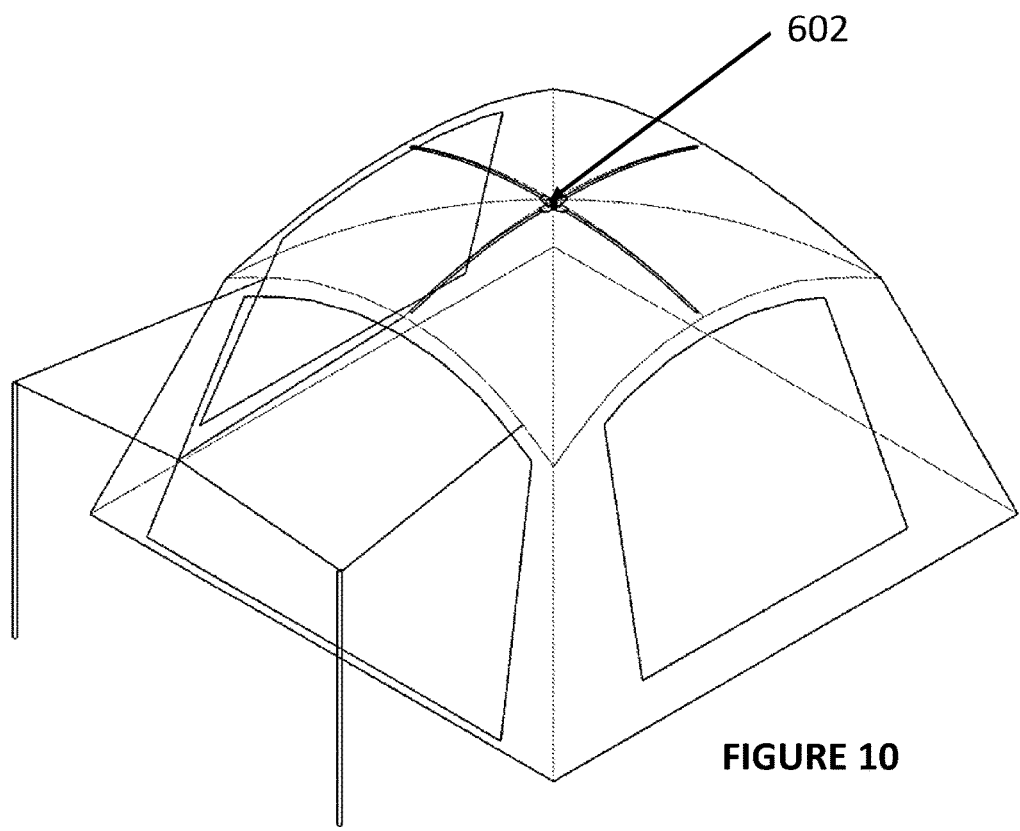
Figure 11:
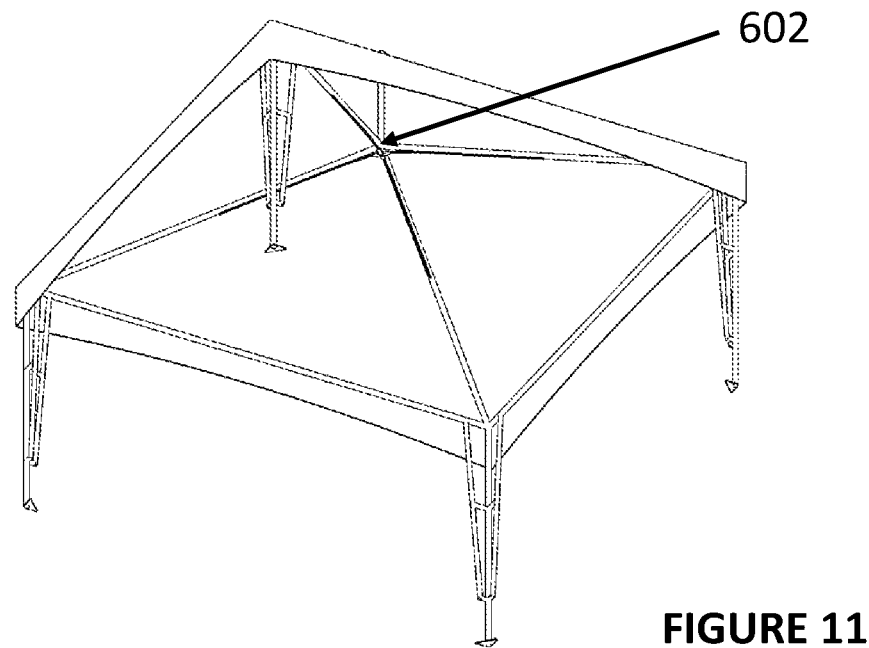
FIGS. 11-14 illustrate exemplary placements of the lighting apparatus 602 with a canopy, according to some embodiments of the disclosure.
Figure 12:
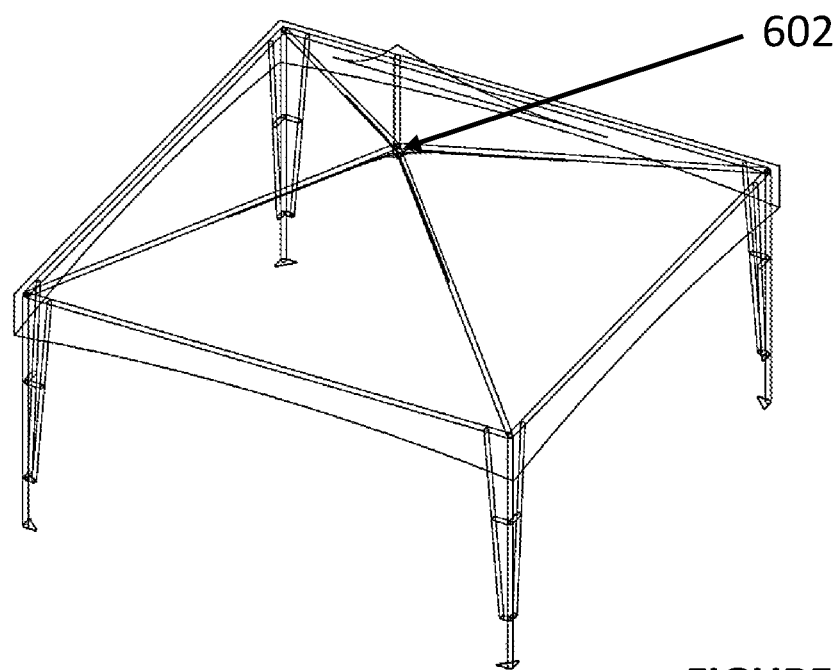
Figure 13:
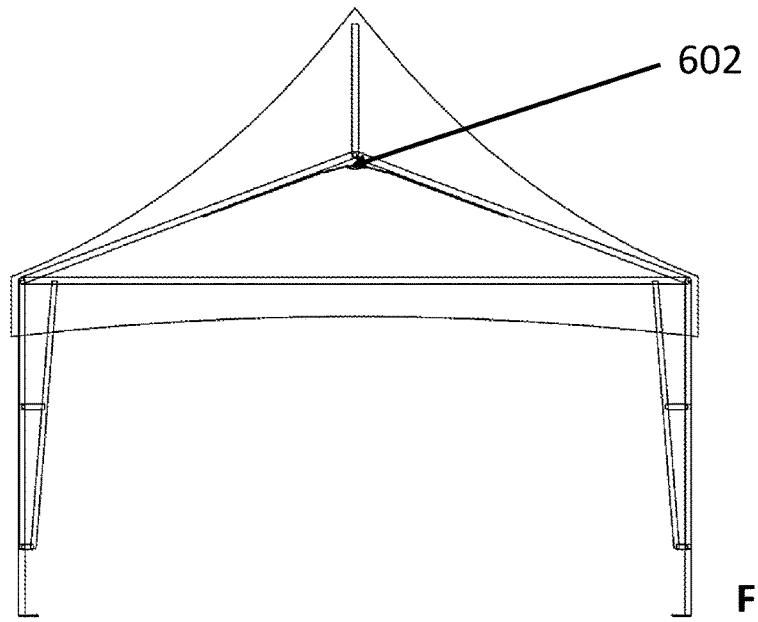
Figure 14:
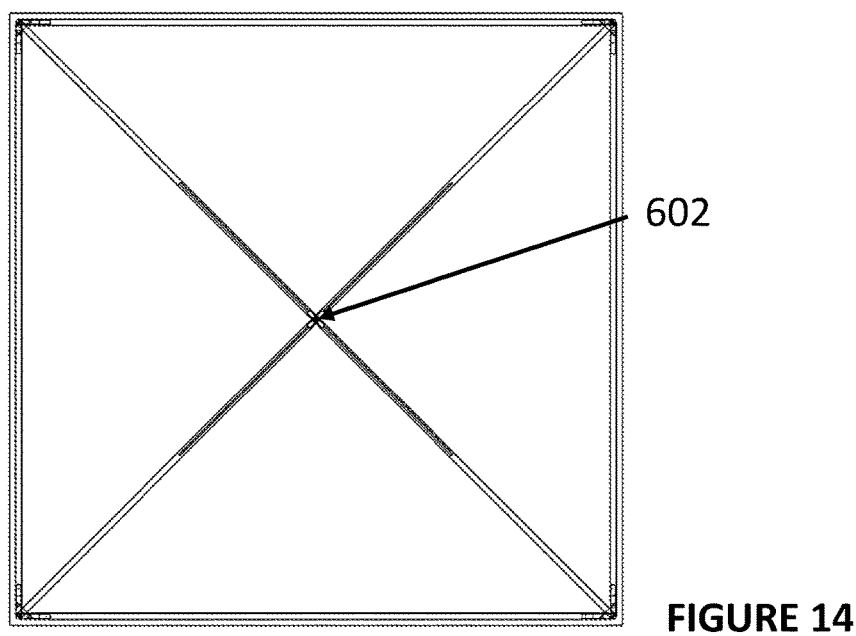

FIG. 3 is a left/right side exploded view of a lighting apparatus, according to some embodiments of the disclosure. Left and right sides are interchangeable, and can vary depending on user configuration of the device. FIG. 4 is a first perspective exploded view of a lighting apparatus, according to some embodiments of the disclosure. FIG. 5 is a second perspective exploded view of a lighting apparatus, according to some embodiments of the disclosure. FIG. 5 flips the lighting apparatus in FIG. 4 upside down. Note that references herein to the top, bottom, left, and right of the lighting apparatus or housing are interchangeable, and can depend on how a user wants to orient the lighting apparatus or housing.

Exemplary openings 130 through which lighting strips can be (removably) attached or coupled to the "central piece" 104 is illustrated by FIGS. 3-5.

In some embodiments, the lighting apparatus includes a top light 120 (or one or more top lights) located on one side of the housing, wherein the top light is electrically coupled to and controllable by the lighting controller. The housing can include a transparent or translucent member 122 covering the top light. In some embodiments, the lighting apparatus includes a bottom light 124 (or one or more bottom lights) located on one side (opposite side of the bottom side) of the housing, wherein the bottom light is coupled to and controllable by the lighting controller. The housing may include a transparent or translucent member 126 covering the bottom light. The top and bottom lights can provide further illumination of a tent, canopy, and automobile, in addition to the lighting offered by the lighting strips. The lighting strips, the top light, and the bottom light are individually controllable by the lighting controller.

Exemplary Locations of where the Lighting Apparatus can be Used

FIGS. 6-10 illustrate exemplary placements of the lighting apparatus 602 with a tent, according to some embodiments of the disclosure. The orientation of the lighting apparatus 602 can be rotated to fit a user's need or the structure of the tent.

FIGS. 11-14 illustrate exemplary placements of the lighting apparatus 602 with a canopy, according to some embodiments of the disclosure. The orientation of the lighting apparatus 602 can be rotated to fit a user's need or the structure of the canopy.

Figure 15:
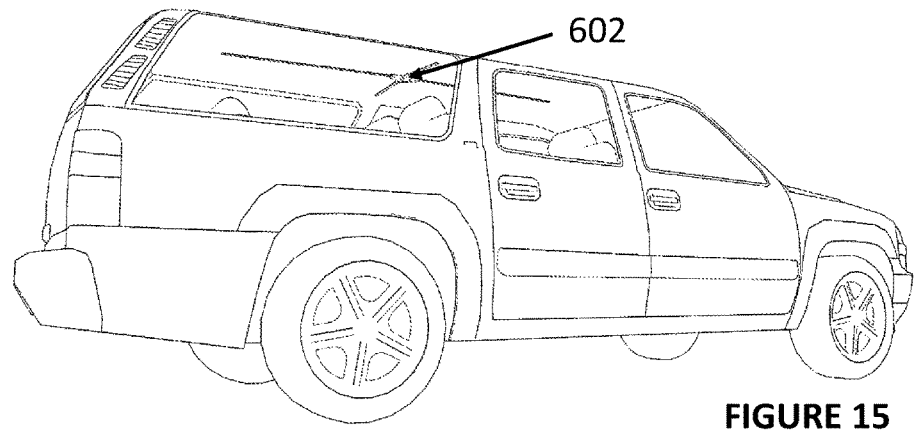
FIGS. 15-17 illustrate exemplary placements of the lighting apparatus with an automobile, according to some embodiments of the disclosure.
Figure 16:
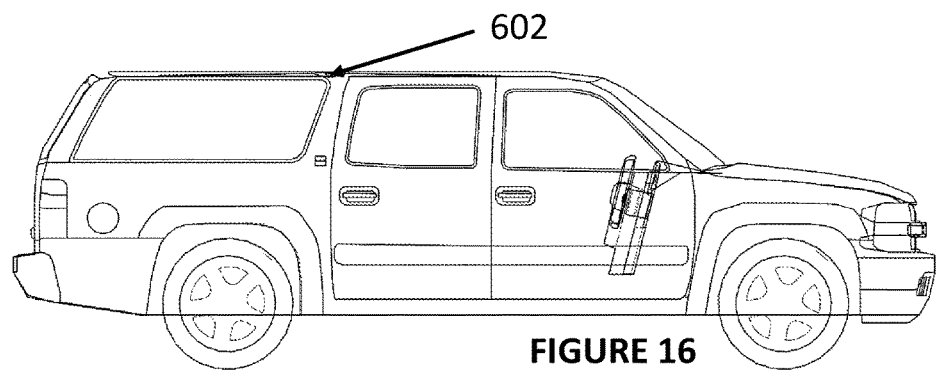
Figure 17:
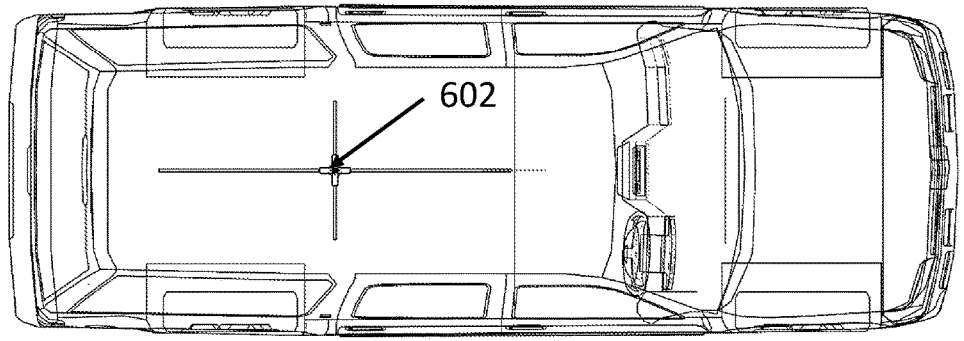

FIGS. 15-17 illustrate exemplary placements of the lighting apparatus 602 with an automobile, according to some embodiments of the disclosure. The orientation of the lighting apparatus 602 can be rotated to fit a user's need or the structure of the automobile.

Exemplary System

Figure 18:
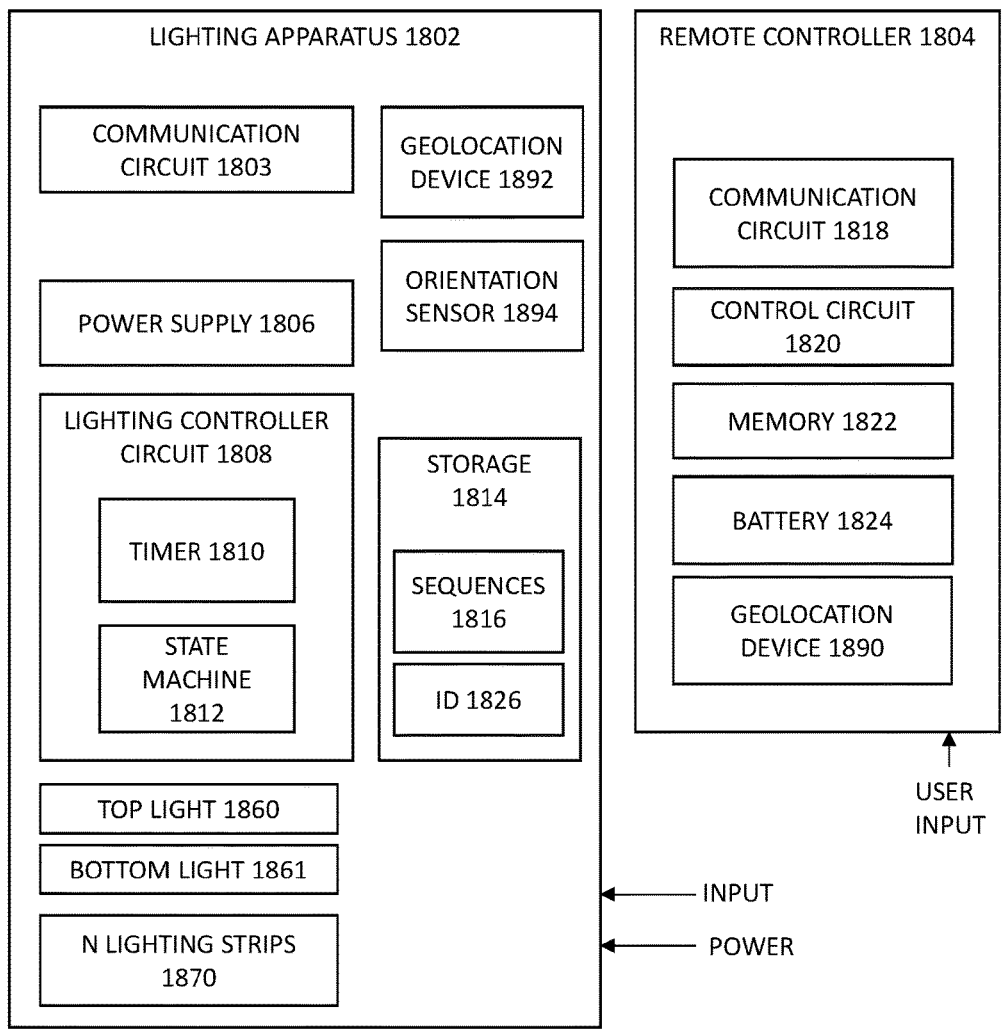
FIG. 18 is a system diagram illustrating a lighting apparatus and remote controller, according to some embodiments of the disclosure.

FIG. 18 is a system diagram illustrating a lighting apparatus 1802 and remote controller 1804, according to some embodiments of the disclosure. In a preferred embodiment, one or more remote controllers, such as the exemplary remote controller 1804 can be provided for a user to control the lighting apparatus 1802 remotely. Lighting apparatus 1802 includes one or more of the following: communication circuit 1803, power supply 1806, lighting controller circuit 1808, storage 1814, top light 1860, bottom light 1861, N lighting strips 1870 (e.g., N is greater than or equal to 3). Exemplary remote controller 1804 can include one or more of the following: communication circuit 1818, control circuit 1820, memory 1822, battery 1824 (or power supply), and geolocation device 1890).

The lighting apparatus 1802 has a communication circuit 1803; the remote controller 1804 also has a communication circuit 1818. Both communication circuits enable the remote controller 1804 to communicate with the lighting apparatus 1802. The communication circuits can use a suitable wireless communication scheme. The communication circuit 1803 can be configured to receive an input comprising an identifier for identifying one or more ones of the lighting sequences. The remote controller 1804 can include a control circuit 1820 for processing user input (e.g., button presses) and generating appropriate signals to control the lighting apparatus 1802. The memory 1822 can include information which enables suitable signals (or commands) to be generated by the control circuit 1820 based on user input. The signals can be provided as input to the lighting apparatus 1802 via wireless communication using the communication circuits.

The remote controller 1804 is preferably a mobile device, thus it can include a battery 1824 to power the remote controller 1804. In some embodiments, the remote controller 1804 is a smart phone or tablet having an application implementing the functionalities described here. In some embodiments, the remote controller 1804 is a computing device. In some embodiments, remote controller 1804 includes a geolocation device 1890 for determining relative and/or absolute location of the remote controller 1804.

A remote controller 1804 can be paired with a lighting apparatus 1802, such that the remote controller 1804 is configured to control only the lighting apparatus that is paired with the remote controller 1804. Pairing ensure ensuring that signals being sent by the communication circuit 1818 of remote controller 1804 identifies a particular lighting apparatus (e.g., via a serial number or handshake which establishes a unique identifier or code that the remote controller 1804 can use to identify the lighting apparatus that is paired with the remote controller). Pairing can be done, e.g., using an application implemented on the remote controller, by requesting a user to enter in a unique identifier of the lighting apparatus of interest into the application.

A remote controller 1804 can also be a master controller for many lighting apparatuses. The remote controller 1804 can individually control a plurality of lighting devices. The remote controller 1804 can control a group of lighting devices or individually control groups of lighting devices.

In some cases, the remote controller acting as a master controller can override control communications of another remote controller acting as a slave controller. In some embodiments the master controller device can control a lighting apparatus via the slave controller that is paired specifically with the lighting apparatus.

The lighting apparatus 1802 can include a power supply 1806 (e.g., preferably enclosed in the "central piece" of the lighting apparatus). In some preferred embodiments, the power supply 1806 can be removably attached to the lighting apparatus. The power supply can include rechargeable batteries. The power supply can include one or more batteries, preferably one or more rechargeable batteries with circuitry and hardware to allow a user to charge the rechargeable batteries. Batteries can be rechargeable via any suitable means, in some cases, via solar panels.

The power supply 1806 can include a regulator for regulating voltage and/or current being delivered by the rechargeable batteries to the electrical circuitry controlling the lighting elements on the flexible strips. In some embodiments, the regulator can be controlled to reduce the amount of power being delivered by the power supply to ensure the lighting apparatus 1802 can meet a required minimum amount of operating time. The power supply 1806 can also include power saving circuitry for extending the battery life of the power supply. The power saving circuitry can be activated, e.g., remotely, to turn off the lighting apparatus. For example, the power saving circuitry can stop power from being delivered to lighting elements during day time or at a time when it is not necessary or desirable to have the lighting apparatus turned on.

The lighting apparatus 1802 can include a lighting controller circuit 1808 (e.g., a microprocessor or other suitable circuitry), which can generate appropriate signals to control light elements, e.g., top light 1860, bottom light 1861, and lighting strips 1870. The lighting controller circuit 1808 can execute the identified one or more ones of the lighting sequences in response to receiving the input. The lighting controller circuit 1808 can include a timer 1810 to implement any mode of lighting involving specific timing. In one example, the timer is used as sleep timer to prevent excessive usage of the power supply. In another example, the timer is used to execute pulses of light or specific lighting sequences having duration specifications, e.g., frequency, periods. The lighting controller circuit 1808 may include a state machine 1812 to implement any mode of lighting involving a lighting sequence, or to generate control signals to execute pre-programmed lighting sequences (having associated identifiers). The lighting apparatus 1802 can include a storage element 1814 coupled to the lighting controller circuit, which can include data encoding lighting sequences usable by the lighting controller circuit for executing the lighting sequences using the lighting elements. The data can include sequences 1816 (and identifiers for the sequences). Sequences 1816 can be pre-programmed onto the storage element 1814 (prior to an end user having the device), or a user may use the remote controller 1804 to remotely program or modify sequences 1816.

Method for Operation

Figure 19:
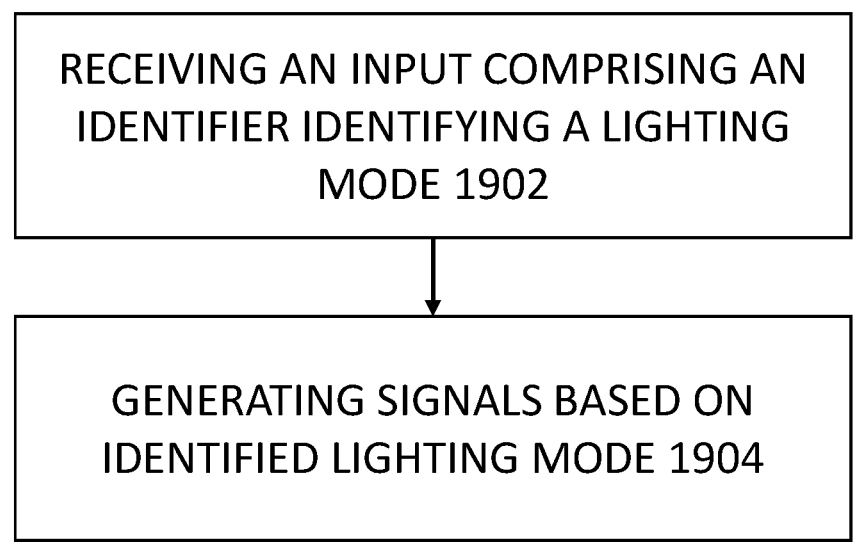
FIG. 19 is a flow diagram illustrating a method for operating the lighting apparatus, according to some embodiments of the disclosure.

FIG. 19 is a flow diagram illustrating a method for operating the lighting apparatus, according to some embodiments of the disclosure. In task 1902, the lighting apparatus can receive an input comprising an identifier for identifying a lighting mode by a communication circuit, said input being transmitted to the lighting apparatus from a remote controller. In task 1904, a lighting controller in a housing can generate signals based on the identified lighting mode to control a plurality of flexible strips having lighting elements thereon, wherein the flexible strips are electrically coupled to the lighting controller and extends away from the lighting controller.

In some embodiments, the lighting elements can emit light to illuminate a temporary structure, tent, canopy, or automobile based on the signals generated by the lighting controller.

In some embodiments, the lighting mode comprises comprising a sequence of lighting states encoded in a storage or storage element of the lighting apparatus. Generating signals by the lighting controller comprises generating signals according to the sequence of lighting states encoded in the storage of the lighting apparatus to execute the sequence using the lighting elements on the flexible strips. The lighting mode can also specify lighting states for the top light and/or bottom light.

In some embodiments, the lighting mode enables a user to locate his/her tent/canopy, among many tents and canopies. A remote controller paired with a user's lighting apparatus can control the lighting apparatus to emit light according to a lighting mode specified by the user using the remote controller. A user can locate his/her tent/canopy by identifying the lighting mode.

In some embodiments, the lighting mode enables emergency signaling. A remote controller paired with a user's lighting apparatus can control the lighting apparatus to emit light according to a lighting mode associated with emergency (flashing red) specified by the user using the remote controller. Emergency response personnel can locate his/her tent/canopy by identifying the lighting mode associated with an emergency.

In some embodiments, the lighting mode corresponds to a marketing campaign. The lighting apparatus can be controlled to emit light having a particular color (e.g., trademarked color(s) associated with a brand).

Exemplary Systems and Methods for Large-Scale Remote Operation

When a large number of lighting apparatuses (e.g., more than a hundred) are provided in/on tents across a large field (e.g., at camping festivals or large camp grounds), the lighting apparatuses can be operated together in unique ways. However, operating the lighting apparatuses to achieve visual results presents a set of communication and computing challenges. To address some of these challenges, methods can be implemented for remotely controlling many lighting apparatuses, e.g., many lighting apparatuses provided with many tents spread across an area. Typically, many tents are placed close to each other forming a "sea of tents" across the area.

An exemplary method of remotely controlling a plurality of lighting apparatuses can include receiving a lighting specification for the lighting apparatuses from a user, wherein the lighting apparatuses are spread geographically over an area, the lighting apparatuses are placed with a plurality of tents located in the area, and each lighting apparatus comprises a central piece with lighting strips extending outwards from the central piece; determining one or more commands for controlling lighting modes of the plurality of lighting apparatuses based on the lighting specification; and transmitting packets including the one or more determined commands targeted for the lighting apparatuses to cause the plurality of lighting apparatuses to emit light according to the lighting specification.

In some embodiments, the method can further include receiving location information associated with the plurality of lighting apparatuses. The location information for a particular lighting apparatus can be determined by a slave controller located near the lighting apparatus and paired with the lighting apparatus. For instance, the location information is determined by geolocation devices in remote controllers that are paired with lighting apparatuses (e.g., global positioning system devices or geolocation devices in a smart phone), and the location information provides a sufficiently accurate estimation of locations of the lighting apparatuses. In some cases, the location information can be determined by a geolocation device 1892 of the lighting apparatus 1802, as seen in FIG. 18.

Generally speaking, the location information can include relative location information of the particular lighting apparatus (e.g., estimated by signal strength measurements of signals received from other signal sources), or absolute location information of the particular lighting apparatus. Relative location information can be location information describing the location of a particular lighting apparatus with respect to an object having a known location such that an absolution location of the particular lighting apparatus can be derived. The location information can be transmitted to a master controller.

Determining one or more commands comprises: mapping the location information to spatial information of an image in the lighting specification, and determining commands for the plurality of lighting apparatuses specifying different lighting modes for the lighting apparatuses based on the mapping. Effectively, the method maps the location information of lighting apparatuses to pixels of an image to be displayed using the lighting apparatuses. Depending on the color values of the pixels, the lighting apparatuses can be commanded to display a particular color value based on the lighting specification. The lighting apparatuses can be uniquely addressable, so with the location information associated with each lighting apparatus, the method can coordinate a large-scale display using the lighting apparatuses.

In some embodiments, the method comprises receiving orientation and position information associated with the plurality of lighting apparatuses. Since a lighting apparatus can have individually controllable lighting strips extending away from the central piece of the lighting apparatus, the different lighting strips can serve as finer pixels (finer than a pixel being represented by a single lighting apparatus) if the orientation of the lighting apparatus is known. In some cases, the orientation information can be determined by an orientation sensor 1894 of the lighting apparatus 1802, as seen in FIG. 18. The orientation sensor 1894 is preferably located in the "central piece" of the lighting apparatus. The orientation information can be transmitted to a master controller.

Determining one or more commands can comprise: mapping the orientation and position information to spatial information of an image in the lighting specification, and determining commands for individually controlling the lighting strips of the plurality of lighting apparatuses based on the mapping. Effectively, one single lighting apparatus can have up to N number of pixel values when mapping the orientation and location information to the spatial information of an image in the lighting specification. The lighting apparatuses and the lighting strips of each lighting apparatuses can be uniquely addressable, so with the orientation and location information associated with each lighting apparatus, the method can coordinate a higher-resolution large-scale display using the lighting apparatuses.

In some embodiments, the packets comprises identifying information of the lighting apparatuses to individually address the lighting apparatuses in the packets being transmitted. In some cases, the packet comprises identifying information of the lighting strips of the lighting apparatuses to individually address the lighting strips of the lighting apparatuses in the packets being transmitted.

In some embodiments, transmitting the packets comprises: broadcasting a first command in the packets for a first portion of the area; and broadcasting a second command in the packets different from the first command for a second portion of the area separate from the first portion of the area. If the portions of the area are sufficiently disjoint or far away from each other, the lighting apparatuses may be still be controllable as groups of apparatuses within the different portions of the area even when the lighting apparatuses are not individually addressable. A hop count and a maximum hop limit can be used in the packets if the packets are being relayed across the field of lighting apparatuses to control the radius of the portions of the area being controlled as a group. Lighting apparatuses relaying packets and increment the hop count each time the packet is being relayed, and drops the packet when the maximum hop limit is reached.

In some embodiments, transmitting the packets comprises: transmitting a first command in the packets towards in a first direction towards a first subset of lighting apparatuses in the area; and broadcasting a second command in the packets different from the first command towards in a second direction different from the first direction towards a second subset of lighting apparatuses in the area. The lighting apparatuses may be still be controllable as groups of apparatuses within range of the different directions (e.g., as pie wedges extending radially from the source of transmission) even when the lighting apparatuses are not individually addressable. A hop count and maximum hop limit can also be applied in this scenario to control the distance of the spread of packets (i.e., the size/spread of the group being controlled directionally) if the packets are being relayed across the field of lighting apparatuses.

In some cases, the storage element 1814 of lighting apparatus 1802 can include a unique identifier 1826 (e.g., a unique address or identifier stored in storage element 1814) making the lighting apparatus uniquely addressable by a controller remote from the lighting apparatus 1802, e.g., remote controller 1804. The unique identifier can be unique to the lighting apparatus 1802 only, or can be unique to a group of lighting apparatuses having the lighting apparatus. The lighting apparatus can receive broadcast messages from more than one remote controller, and may be configured to only execute or process messages having the unique identifier 1826.

The remote controller 1804 can be a console (or computing device) operated by a lighting director to control a large number of lighting apparatuses. The large number of light apparatuses can be in a park, festival camping grounds, camping site emergency camps, refugee camps, remote research base, military base, etc. The communication circuit 1803 of a lighting apparatus can be configured to receive data, e.g., packets or messages, from the console via a suitable protocol. The console can be a DMX light controller, using e.g., D-Fi wireless transmission system/protocol. DMX or DMX512 (Digital Multiplex) is a standard for digital communication networks that are commonly used to control stage lighting and effects. Other protocols can also be used. The packets or messages from the console can identify the lighting apparatus 1802 by its unique identifier 1826 and select/specify a pre-programmed lighting mode. In response, the lighting apparatus can execute the lighting mode specified in the packets or messages. At a large-scale, many lighting apparatuses 1802 can be coordinated to, e.g., emit the same color of light in unison. A lighting apparatus can also be randomly selected to emit a particular color or execute a particular lighting mode, since the lighting apparatuses are individually addressable. Many lighting apparatuses 1802 can be coordinated to emit light according to a two-dimensional or three-dimensional image.

In some cases, the data from the console or some other suitable master controller can be communicated to the communication circuit 1803 via another remote controller (such as a mobile device), such as a remote controller acting as a slave controller that is paired to the lighting apparatus. The master controller can communicate with the slave controller via cellular service or other suitable wireless communication medium. The slave controller can communicate or relay data to the lighting apparatus paired with the slave controller.

In some cases, a master controller leverages a slave controller to carry out complex large scaled coordinated lighting events. In such implementations, the slave controller may include geolocation device 1890, which can provide or estimate the location of the lighting apparatus paired with the slave controller. Alternatively, a user of the slave controller can report location information of the lighting apparatus to the slave controller. Location information can be gathered by the slave controller (from a geolocation device 1890 or from a user) at the time of pairing when a user having the slave controller is physically next to the lighting apparatus. Since the lighting apparatus is provided with a tent which does not change location drastically over a period of time (people do not move the tents over the period of time after the tent is set), the location information being gathered can provide a correct and accurate estimate of the location of the apparatus even when the user is not near the tent at a later time. The master controller can collect location estimates of the lighting apparatuses and control the lighting apparatuses by mapping an image to be displayed to the locations of the lighting apparatuses. For instance, using the location estimates or location information of the lighting apparatuses and a desired two-dimensional or three-dimensional display of interest, it is possible to determine commands that can control individual lighting apparatuses (and individual lighting elements of such lighting apparatuses) accordingly. Logo, picture, animation, video, or motion picture can be displayed using many lighting apparatus spread across a field.

It is possible to also coordinate the lighting apparatuses to operate in unison or in groups by broadcasting packets/messages (even without the appropriate unique identifiers) to the lighting apparatuses. In some embodiments, other lighting apparatuses can be programmed to relay packets/messages to other lighting apparatuses. The packets/messages can specify a lighting mode that the lighting apparatus is programmed to execute. A console can be used, as an example to broadcast packets/messages. The console can be a DMX lighting controller, using e.g., D-Fi wireless transmission system/protocol. Other wireless communication protocols can also be used. In some cases, directional communication utilizing beam forming, targeted area antennas, targeted area broadcasting using remote controllers that are placed in predetermined locations can be used to control the lighting apparatuses geographically in groups. As a result, a coordinated display can still be implemented even though the lighting devices may not be individually addressable.

In some cases, the broadcast communications can be sent from a remote controller to a selected lighting apparatus among a group of lighting apparatuses configured to relay messages to other lighting apparatuses in the group. A given broadcast communication include a maximum number of relay hops allowed and a number of hops the message has traveled. Such broadcast communication for controlling the lighting apparatuses can also be used to control a group of lighting apparatuses (i.e., direct a subset of the lighting apparatus to use a particular lighting mode). For instance, lighting apparatuses within a particular radius can be controlled together, to implement a particular display of lights.

EXAMPLES

Example 1 is lighting apparatus comprising: a plurality of flexible strips having lighting elements thereon; a communication circuit for receiving signals transmitted to the lighting apparatus from a remote controller; a lighting controller circuit for controlling the lighting elements of the flexible strips based on the signals; and a housing enclosing the lighting controller circuit and a power supply; wherein the flexible strips are electrically coupled to the lighting controller and extends radially away from the lighting controller.

In Example 2, the lighting apparatus of Example 1, can further include: a top light (or a light) located on one side of the housing, wherein the top light is electrically coupled to and controllable by the lighting controller.

In Example 3, the lighting apparatus of Example 2 can further include: the housing comprising a transparent or translucent member covering the top light.

In Example 4, the lighting apparatus of any one of Examples 1-3 can further include: a bottom light (or a light) located on one side of the housing, wherein the bottom light is coupled to and controllable by the lighting controller.

In Example 5, the lighting apparatus of Example 4, can optionally include the housing comprising a transparent or translucent member covering the bottom light.

In Example 6, the lighting apparatus of any one of Examples 1-5 can optionally include the flexible strips being removably coupled to the lighting controller through a mechanical connector.

In Example 7, the lighting apparatus of any one of Examples 1-6 can optionally include: the flexible strips extending away from the lighting controller through openings of the housing.

In Example 8, the lighting apparatus of any one of Examples 1-7 can optionally include: means for hanging the housing to a part of a tent or canopy.

In Example 9, the lighting apparatus of Example 8 can optionally include the means comprising a clip for attaching the lighting apparatus to fabric or flexible sheet.

In Example 10, the lighting apparatus of any one of Examples 8 or 9 can optionally include the means comprising a magnet for attaching the lighting apparatus to metal.

In Example 11, the lighting apparatus of any one of Examples 1-10 can optionally include one or more members attachable to cavities of the housing, wherein the one or more members comprises means for attaching the one or more members to a tent or canopy.

In Example 12, the lighting apparatus of Examples 11 can optionally include the means comprising a clip for attaching the lighting apparatus to fabric or flexible sheet.

In Example 13, the lighting apparatus of any one of Examples 11 or 12 can optionally include the means comprising a magnet for attaching the lighting apparatus to metal.

In Example 14, the lighting apparatus of any one of Examples 1-13 can optionally include loops fitted around the flexible strips attached to clips for hanging the plurality of flexible strips to fabric or a flexible sheet.

In Example 15, the lighting apparatus of any one of Examples 1-14 can optionally include loops fitted around the flexible strips attached to magnets for attaching the plurality of flexible strips to metal.

In Example 16, the lighting apparatus of any one of Examples 1-15 can optionally include loops fitted around the flexible strips attached to hooks for hanging the plurality of flexible strips on hoops, rods, or tent poles.

In Example 17, the lighting apparatus of any one of Examples 1-16 can optionally include the housing comprising silicone.

In Example 18, the lighting apparatus of any one of Examples 1-17 can optionally include the plurality of flexible strips comprising at least three flexible strips.

In Example 19, the lighting apparatus of any one of Examples 1-18 can optionally include the housing comprising portions extending outwards on a plane away from a center portion of a housing, and the portions encloses parts of the flexible strips.

In Example 20, the lighting apparatus of any one of Examples 1-19 can optionally include the flexible strips comprising a flexible circuit encased in transparent or translucent material to provide a smooth outer surface for the flexible strips.

In Example 21, the lighting apparatus of any one of Examples 1-20 can optionally include a storage element coupled to the lighting controller circuit comprises data encoding lighting sequences usable by the lighting controller circuit for executing the lighting sequences using the lighting elements.

In Example 22, the lighting apparatus of Example 21 can optionally include the communication circuit being configured to receive an input comprising an identifier for identifying one or more ones of the lighting sequences.

In Example 23, the lighting apparatus of Example 22 can optionally include the lighting controller circuit executing the identified one or more ones of the lighting sequences in response to receiving the input.

In Example 24, the lighting apparatus of any one of Examples 1-23 can optionally include the lighting controller circuit comprising a timer.

In Example 25, the lighting apparatus of any one of Examples 1-24 can optionally include the lighting controller circuit comprising a state machine for generating control signals to execute pre-programmed lighting sequences.

Example 26 is a method for operating a lighting apparatus, the method comprising: receiving an input comprising an identifier for identifying a lighting mode by a communication circuit, said input being transmitted to the lighting apparatus from a remote controller; and generating signals, by a lighting controller in a housing, based on the identified lighting mode to control a plurality of flexible strips having lighting elements thereon, wherein the flexible strips are electrically coupled to the lighting controller and extends away from the lighting controller.

In Example 27, the method of Example 26 can optionally include emitting light, by the lighting elements, to illuminate a tent, canopy, or automobile based on the signals generated by the lighting controller.

In Example 28, the method of Example 26 or 27 can optionally include: the light mode comprising a sequence of lighting states encoded in a storage of the lighting apparatus; and generating signals by the lighting controller comprising generating signals according to the sequence of lighting states encoded in the storage of the lighting apparatus to execute the sequence using the lighting elements on the flexible strips.

Variations, Implementation, and Applications

In one implementation, operations/functions related to the lighting apparatus and a remote controller described herein may include software to achieve (or to foster) the functions discussed herein for operating the lighting apparatus where the software is executed on one or more processors to carry out the functions. This could include the implementation of instances of lighting controller circuit and control circuit and/or any other suitable element that would foster the activities discussed herein. Additionally, each of these elements can have an internal structure and circuitry (e.g., a processor, a memory element, etc.) to facilitate some of the operations described herein. In other embodiments, these functions may be executed externally to these elements, or included in some other network element to achieve the intended functionality. Alternatively, the lighting apparatus and the remote controller 1804 may include software (or reciprocating software) that can coordinate with other network elements in order to achieve the functions described herein. In still other embodiments, one or several devices may include any suitable algorithms, hardware, software, components, modules, interfaces, or objects that facilitate the operations thereof.

In certain example implementations, the functions outlined herein may be implemented by logic encoded in one or more non-transitory, tangible media (e.g., embedded logic provided in an application specific integrated circuit [ASIC], digital signal processor [DSP] instructions, software [potentially inclusive of object code and source code] to be executed by one or more processors, one or more microcontrollers, circuits, or other similar machine, etc.). In some of these instances, one or more memory elements (e.g., storage element 1814, memory 1822) can store data used for the operations described herein. This includes the memory element being able to store instructions (e.g., software, code, etc.) that are executed to carry out the activities described in this Specification. The processor can execute any type of instructions associated with the data to achieve the operations detailed herein in this Specification. In one example, the processor could transform an element or an article (e.g., data) from one state or thing to another state or thing. In another example, the activities outlined herein may be implemented with fixed logic or programmable logic (e.g., software/computer instructions executed by the processor) and the elements identified herein could be some type of a programmable processor, programmable digital logic (e.g., a field programmable gate array [FPGA], an erasable programmable read only memory (EPROM), an electrically erasable programmable ROM (EEPROM)) or an ASIC that includes digital logic, software, code, electronic instructions, or any suitable combination thereof. The lighting apparatus and the remote controller can include memory elements for storing information to be used in operating the lighting apparatus, as outlined herein. Additionally, each of these devices may include a processor that can execute software or an algorithm to perform the size estimation activities as discussed in this Specification. These devices may further keep information in any suitable memory element [random access memory (RAM), ROM, EPROM, EEPROM, ASIC, etc.], software, hardware, or in any other suitable component, device, element, or object where appropriate and based on particular needs. Any of the memory items discussed herein should be construed as being encompassed within the broad term 'memory element.' Similarly, any of the potential processing elements, modules, and machines described in this Specification should be construed as being encompassed within the broad term 'processor.' Each of the network elements can also include suitable interfaces for receiving, transmitting, and/or otherwise communicating data or information in a network environment.

It is also important to note that the steps in the FIG. 19 and other steps described herein illustrate only some of the possible scenarios that may be executed by, or within, the systems and apparatuses described herein. Some of these steps may be deleted or removed where appropriate, or these steps may be modified or changed considerably without departing from the scope of the present disclosure. In addition, a number of these operations have been described as being executed concurrently with, or in parallel to, one or more additional operations. However, the timing of these operations may be altered considerably. The preceding operational flows have been offered for purposes of example and discussion. Substantial flexibility is provided by the systems and apparatuses in that any suitable arrangements, chronologies, configurations, and timing mechanisms may be provided without departing from the teachings of the present disclosure.

The foregoing outlines features of several embodiments so that those skilled in the art may better understand the aspects of the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions, and alterations herein without departing from the spirit and scope of the present disclosure.

The particular embodiments of the present disclosure may readily include a system on chip (SOC) central processing unit (CPU) package. An SOC represents an integrated circuit (IC) that integrates components of a computer or other electronic system into a single chip. It may contain digital, analog, mixed-signal, and radio frequency functions: all of which may be provided on a single chip substrate. Other embodiments may include a multi-chip-module (MCM), with a plurality of chips located within a single electronic package and configured to interact closely with each other through the electronic package. In various other embodiments, the digital signal processing functionalities may be implemented in one or more silicon cores in ASICs, FPGAs, and other semiconductor chips.

In example implementations, at least some portions of the processing activities outlined herein may also be implemented in software. In some embodiments, one or more of these features may be implemented in hardware provided external to the elements of the disclosed figures, or consolidated in any appropriate manner to achieve the intended functionality. The various components may include software (or reciprocating software) that can coordinate in order to achieve the operations as outlined herein. In still other embodiments, these elements may include any suitable algorithms, hardware, software, components, modules, interfaces, or objects that facilitate the operations thereof.

In one example embodiment, any number of embodiments disclosed herein may be implemented on a board of an associated electronic device. The board can be a general circuit board that can hold various components of the internal electronic system of the electronic device and, further, provide connectors for other peripherals. More specifically, the board can provide the electrical connections by which the other components of the system can communicate electrically. Any suitable processors (inclusive of digital signal processors, microprocessors, supporting chipsets, etc.), computer-readable non-transitory memory elements, etc. can be suitably coupled to the board based on particular configuration needs, processing demands, computer designs, etc. Other components such as external storage, additional sensors, controllers for audio/video display, and peripheral devices may be attached to the board as plug-in cards, via cables, or integrated into the board itself.

Any suitably-configured processor component can execute any type of instructions associated with the data to achieve the operations detailed herein. Any processor disclosed herein could transform an element or an article (for example, data) from one state or thing to another state or thing. In another example, some activities outlined herein may be implemented with fixed logic or programmable logic (for example, software and/or computer instructions executed by a processor) and the elements identified herein could be some type of a programmable processor, programmable digital logic (for example, a FPGA, an EPROM, an electrically erasable programmable read only memory (EEPROM)), an ASIC that includes digital logic, software, code, electronic instructions, flash memory, optical disks, CD-ROMs, DVD ROMs, magnetic or optical cards, other types of machine-readable mediums suitable for storing electronic instructions, or any suitable combination thereof. In operation, processors may store information in any suitable type of non-transitory storage medium (for example, RAM, read only memory (ROM), FPGA, EPROM, electrically erasable programmable ROM (EEPROM), etc.), software, hardware, or in any other suitable component, device, element, or object where appropriate and based on particular needs. Further, the information being tracked, sent, received, or stored in a processor could be provided in any database, register, table, cache, queue, control list, or storage structure, based on particular needs and implementations, all of which could be referenced in any suitable timeframe. Any of the memory items discussed herein should be construed as being encompassed within the broad term 'memory' or 'memory element'. Similarly, any of the potential processing elements, modules, and machines described herein should be construed as being encompassed within the broad term 'microprocessor' or 'processor.'

Computer program logic implementing all or part of the functionality described herein is embodied in various forms, including, but in no way limited to, a source code form, a computer executable form, and various intermediate forms (for example, forms generated by an assembler, compiler, linker, or locator). In an example, source code includes a series of computer program instructions implemented in various programming languages, such as an object code, an assembly language, or a high-level language such as OpenCL, Fortran, C, C++, JAVA, or HTML for use with various operating systems or operating environments. The source code may define and use various data structures and communication messages. The source code may be in a computer executable form (e.g., via an interpreter), or the source code may be converted (e.g., via a translator, assembler, or compiler) into a computer executable form.

Note that with the numerous examples provided herein, interaction may be described in terms of two, three, four, or more electrical components. However, this has been done for purposes of clarity and example only. It should be appreciated that the system can be consolidated in any suitable manner. Along similar design alternatives, any of the illustrated components, modules, and elements of the FIGURES may be combined in various possible configurations, all of which are clearly within the broad scope of this Specification. In certain cases, it may be easier to describe one or more of the functionalities of a given set of flows by only referencing a limited number of electrical elements. It should be appreciated that the electrical circuits of the FIGURES and its teachings are readily scalable and can accommodate a large number of components, as well as more complicated/sophisticated arrangements and configurations. Accordingly, the examples provided should not limit the scope or inhibit the broad teachings of the electrical circuits as potentially applied to a myriad of other architectures.

Note that in this Specification, references to various features (e.g., elements, structures, modules, components, steps, operations, characteristics, etc.) included in "one embodiment", "example embodiment", "an embodiment", "another embodiment", "some embodiments", "various embodiments", "other embodiments", "alternative embodiment", and the like are intended to mean that any such features are included in one or more embodiments of the present disclosure, but may or may not necessarily be combined in the same embodiments.

Numerous other changes, substitutions, variations, alterations, and modifications may be ascertained to one skilled in the art and it is intended that the present disclosure encompass all such changes, substitutions, variations, alterations, and modifications as falling within the scope of the appended claims. Note that all optional features of the apparatus described above may also be implemented with respect to the method or process described herein and specifics in the examples may be used anywhere in one or more embodiments.

What is claimed is:

1. A lighting apparatus comprising:
    a plurality of flexible strips having lighting elements thereon;
    a communication circuit for receiving signals transmitted to the lighting apparatus from a remote controller;
    a lighting controller circuit for controlling the lighting elements of the flexible strips based on the signals;
    a housing enclosing the lighting controller circuit and a power supply; and
    a storage element coupled to the lighting controller circuit, wherein the storage element comprises data encoding lighting sequences usable by the lighting controller circuit for executing the lighting sequences using the lighting elements, the communication circuit is configured to receive an input comprising an identifier for identifying one or more ones of the lighting sequences, and the lighting controller circuit executes the one or more identified ones of the lighting sequences in response to receiving the input;
    wherein the flexible strips are electrically coupled to the lighting controller circuit and extends radially away from the lighting controller circuit.

2. The lighting apparatus of claim 1 further comprising:
    a light located on one side of the housing, wherein the light is electrically coupled to and controllable by the lighting controller circuit, wherein the housing comprises a transparent or translucent member covering the light.

3. The lighting apparatus of claim 1, wherein the flexible strips are removably coupled to the lighting controller circuit through a mechanical connector.

4. The lighting apparatus of claim 1, wherein the flexible strips extend radially away from the lighting controller circuit through openings of the housing.

5. The lighting apparatus of claim 1, further comprising:
    means for hanging the housing to a part of a tent or canopy, comprising one or more of the following: a clip for attaching the lighting apparatus to fabric or flexible sheet, and a magnet for attaching the lighting apparatus to metal.

6. The lighting apparatus of claim 1, further comprising:
    one or more members attachable to cavities of the housing, wherein the one or more members comprises means for attaching the one or more members to a tent or canopy, and the means include one or more of the following: a clip for attaching the lighting apparatus to fabric or flexible sheet, and a magnet for attaching the lighting apparatus to metal.

7. The lighting apparatus of claim 1, further comprising one or more of the following:
    loops fitted around the flexible strips attached to clips for hanging the plurality of flexible strips to fabric or a flexible sheet;
    loops fitted around the flexible strips attached to magnets for attaching the plurality of flexible strips to metal; and
    loops fitted around the flexible strips attached to hooks for hanging the plurality of flexible strips on hoops, rods, or tent poles.

8. The lighting apparatus of claim 1, wherein the housing comprises portions extending outwards on a plane away from a center portion of a housing, and the portions enclose parts of the flexible strips.

9. The lighting apparatus of claim 1,
    wherein the input received by the communication circuit is sent by a mobile device.

10. The lighting apparatus of claim 1, wherein the lighting controller circuit comprises one or more of the following: a timer, and a state machine for generating control signals to execute pre-programmed lighting sequences.

11. A method for operating a lighting apparatus, the method comprising:

receiving an input, said input comprising an identifier for identifying a lighting mode, by a communication circuit, wherein said input is transmitted to the lighting apparatus from a remote controller, and the light mode comprises a sequence of lighting states encoded in a storage of the lighting apparatus; and generating signals, by a lighting controller in a housing, based on the identified lighting mode according to the sequence of lighting states encoded in the storage of the lighting apparatus, to control a plurality of flexible strips having lighting elements thereon and to execute the sequence of lighting states using the lighting elements on the flexible strips, wherein the flexible strips are electrically coupled to the lighting controller and power supply enclosed in the housing, and the flexible strips extend radially away from the lighting controller.

12. The method of claim 11, further comprising:
emitting light, by the lighting elements, to illuminate a temporary structure, tent, canopy, or automobile, based on the signals generated by the lighting controller.

13. The method of claim 11, wherein:
the remote controller is a mobile device.

14. A method of remotely controlling a plurality of lighting apparatuses, the method comprising:
receiving a lighting specification for the lighting apparatuses from a user, wherein the lighting apparatuses are spread geographically over an area, the lighting apparatuses are placed with a plurality of tents located in the area, and each lighting apparatus comprises a central piece with lighting strips extending outwards from the central piece;
determining one or more commands for controlling lighting modes of the plurality of lighting apparatuses based on the lighting specification; and
transmitting packets including the one or more determined commands targeted for the lighting apparatuses to cause the plurality of lighting apparatuses to emit light according to the lighting specification.

15. The method of claim 14, further comprising:
receiving location information associated with the plurality of lighting apparatuses;
wherein determining the one or more commands comprises:
mapping the location information to spatial information of an image in the lighting specification, and
determining commands for the plurality of lighting apparatuses specifying different lighting modes for the lighting apparatuses based on the mapping.

16. The method of claim 15, wherein the location information is determined by geolocation devices in remote controllers that are paired with lighting apparatuses.

17. The method of claim 14, wherein the packets comprise identifying information of the lighting apparatuses to individually address the lighting apparatuses in the packets being transmitted.

18. The method of claim 14, wherein transmitting the packets comprises:
broadcasting a first command in the packets for a first portion of the area; and
broadcasting a second command in the packets different from the first command for a second portion of the area separate from the first portion of the area.

19. The method of claim 14, wherein transmitting the packets comprises:
transmitting a first command in the packets towards in a first direction towards a first subset of lighting apparatuses in the area; and
broadcasting a second command in the packets different from the first command towards in a second direction different from the first direction towards a second subset of lighting apparatuses in the area.

20. The method of claim 14, further comprising:
receiving orientation and position information associated with the plurality of lighting apparatuses;
wherein determining the one or more commands comprises:
mapping the orientation and position information to spatial information of an image in the lighting specification, and
determining commands for individually controlling the lighting strips of the plurality of lighting apparatuses based on the mapping.

* * * * *